(12) United States Patent
Wang

(10) Patent No.: US 11,003,800 B2
(45) Date of Patent: May 11, 2021

(54) DATA INTEGRITY PROTECTION METHOD AND DEVICE

(71) Applicant: Siemens Aktiengesellschaft, Munich (DE)

(72) Inventor: Xin Yi Wang, Beijing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 258 days.

(21) Appl. No.: 16/191,658

(22) Filed: Nov. 15, 2018

(65) Prior Publication Data

US 2019/0205571 A1  Jul. 4, 2019

(30) Foreign Application Priority Data

Dec. 29, 2017 (CN) .......................... 201711488506.1

(51) Int. Cl.
*G06F 21/60* (2013.01)
*G06F 21/64* (2013.01)
(Continued)

(52) U.S. Cl.
CPC .......... *G06F 21/64* (2013.01); *G05B 23/024* (2013.01); *G06F 16/24578* (2019.01);
(Continued)

(58) Field of Classification Search
CPC .......... G06F 21/62; G06F 21/64; G06F 21/70; G06F 21/71; G06F 16/24578;
(Continued)

(56) References Cited

U.S. PATENT DOCUMENTS

| 8,433,834 B2* | 4/2013 | Tavani | ................. H04L 1/0061 |
| | | | 710/55 |
| 2004/0003132 A1* | 1/2004 | Stanley | ................. G06F 16/20 |
| | | | 719/316 |

(Continued)

FOREIGN PATENT DOCUMENTS

| CN | 108775716 A | 5/2017 |
| EP | 2402879 A1 | 1/2012 |

OTHER PUBLICATIONS

Extended European Search Report dated Apr. 15, 2019.

*Primary Examiner* — Jayesh M Jhaveri
(74) *Attorney, Agent, or Firm* — Harness, Dickey & Pierce, P.L.C.

(57) ABSTRACT

Provided are a data integrity protection method and device for protecting key data in control components of an industrial control system. The method includes establishing a correlation among a plurality of control components in the industrial control system; and determining a summary indicating the integrity of data to be protected in a first control component based on identity features and data features of other control components correlated to the first control component among the plurality of control components. The data features are used for identifying the data to be protected in the control components, and the first control component is any one of the plurality of control components. Since the security of the data in any control component is established over other correlated control components, the key data in the control components can be effectively protected.

15 Claims, 6 Drawing Sheets

(51) Int. Cl.
  *H04L 29/06*    (2006.01)
  *G06F 16/34*    (2019.01)
  *G06F 16/2457*  (2019.01)
  *G05B 23/02*    (2006.01)

(52) U.S. Cl.
  CPC ............ G06F 16/345 (2019.01); *G06F 21/60* (2013.01); *H04L 63/12* (2013.01)

(58) Field of Classification Search
  CPC ........ G06F 16/345; G06F 21/60; G06F 16/34; G05B 19/042; G05B 23/024; H04L 29/06; H04L 63/12
  See application file for complete search history.

(56) References Cited

U.S. PATENT DOCUMENTS

| | | | |
|---|---|---|---|
| 2008/0208374 A1* | 8/2008 | Grgic | G05B 17/02 700/83 |
| 2008/0208375 A1* | 8/2008 | Grgic | G05B 19/042 700/86 |
| 2012/0005480 A1 | 1/2012 | Batke | |
| 2013/0287208 A1* | 10/2013 | Chong | H04L 9/08 380/44 |
| 2018/0285127 A1 | 10/2018 | Shang et al. | |
| 2019/0129407 A1* | 5/2019 | Cella | G05B 23/0291 |
| 2020/0396236 A1* | 12/2020 | Kune | H04L 41/06 |

\* cited by examiner

DATA INTEGRITY PROTECTION METHOD AND DEVICE

PRIORITY STATEMENT

The present application hereby claims priority under 35 U.S.C. § 119 to Chinese patent application number CN 201711488506.1 filed Dec. 29, 2017, the entire contents of which are hereby incorporated herein by reference.

BACKGROUND

Technical Field

Embodiments of the present invention generally relate to the field of industrial control, and particularly relates to a method and a device for protecting data security of an industrial control system.

Background

The industrial control system plays a very important role in power, transportation, fire control and other industries. In the industrial control system, the industrial process is usually controlled by control components. These control components may include, but not limited to, a programmable logic controller (PLC), a supervisory control and data acquisition (SCADA), a unified architecture (OPC UA) object linking and embedding (OLE) for process control (OPC), etc.

These control components usually have two kinds of very important files, i.e., firmware and configuration files. The firmware serving as software for the most basic and bottom work of the system determines the function and performance of hardware equipment. During the operation of the industrial control system, the firmware of some control components needs to be frequently transmitted or updated in the internal network and, in most cases, is unprotected or unsupported, so the firmware is likely to be damaged in transmission and may also be tampered or damaged due to malicious attacks, and then making the entire industrial control system under attack. The configuration files include key information of instruction sets of relevant control strategies and the like to ensure that the system runs normally in accordance with the predetermined strategies and processes, and are thus crucial to the security of the entire system. If the configuration files are damaged or maliciously manipulated, the entire industrial control system may crash. Therefore, it is crucial to protect the security of the data such as the above-mentioned files and the like in the control components of the industrial control system.

At present, the confidentiality and integrity of data files are usually protected by adopting digital signatures, and the files are signed and verified by using digital fingerprints. In the encryption process, it usually needs to generate a public key and private key pair and needs to adopt a digital certificate from a third party. Obviously, the degree of guarantee of depends on the protection on the private key and the digital certificate. Once the information is intercepted, the digital signature can be easily withdrawn.

SUMMARY

In embodiments, the present invention provides a method and a device for implementing integrity protection on key data of each control component in an industrial control system. At least one embodiment associates the security of one control component with other control components, and realizes data protection by determining the integrity of data to be protected in the control component.

According to a first aspect of the present invention, an embodiment of the present invention provides a method, including the steps of establishing a correlation between at least two control components in an industrial control system; and determining a summary indicating the integrity of data to be protected in a first control component based on identity features and data features of other control components correlated to the first control component among the plurality of control components, wherein the data features are used for identifying the data to be protected in the control components, and the first control component is any one of the plurality of control components. The summary of the data integrity protection of any control component in the present invention is determined based on the identity features and the data features of other control components correlated to the control component, and the correlation among the control components may be established according to an arbitrary rule, so if an invalid user desires to attack a data file in any control component, such as firmware or a configuration file, he must know which other control components are correlated to the control component; and, even if he knows other control components correlated to the control component, he also must know which features of these correlated control components have been utilized to determine the integrity protection summary of the control component. Therefore, the amount of computation required for the invalid user to complete the attack is huge, so that the data to be protected in the control components can be effectively protected.

According to a second aspect of the present invention, an embodiment of the present invention provides a data integrity protection device, including: a correlation establishment module, configured to establish a correlation among a plurality of control components in an industrial control system; and a summary generation module, configured to determine a summary indicating the integrity of data to be protected in a first control component based on identity features and data features of other control components correlated to the first control component among the plurality of control components, wherein the data features are used for identifying the data to be protected in the control components, and the first control component is any one of the plurality of control components.

According to a third aspect of the present invention, an embodiment of the present invention provides an industrial control system, including a first control component and at least one second control component, wherein the first control component is programmed to execute an embodiment of the generation and verification method of integrity protection summaries in the present invention. Thus, the security protection of the industrial control system can be realized by using the industrial control system itself without the intervention of external equipment. In addition, according to one embodiment of the present invention, the industrial control system may further include a central node coupled to the first control component and the second control components, wherein the central node is programmed to execute an embodiment of the generation and verification method of the integrity protection summaries in the present invention.

According to a fourth aspect of the present invention, an embodiment of the present invention provides a data integrity protection device, including: at least one memory, configured to store executable instructions; and at least one processor, configured to execute an embodiment of the method of the present invention by executing the instructions to implement generation and verification of data integrity protection summaries. Optionally, the data integrity protection device may be implemented by a central node or a control component. When the central node is adopted, centralized maintenance on the industrial control system can be facilitated, and the burden of each control component is reduced. Moreover, key components in key process flows can be monitored in real time to avoid major failures. When the device is implemented by the control component, it can be designed to periodically maintain and inspect key data of each control component in the industrial control system.

According to a fifth aspect of the present invention, an embodiment of the present invention provides a machine-readable medium, wherein instructions are stored therein, when being executed by a machine, enable the machine to execute an embodiment of the method of the present invention.

Figure 1:
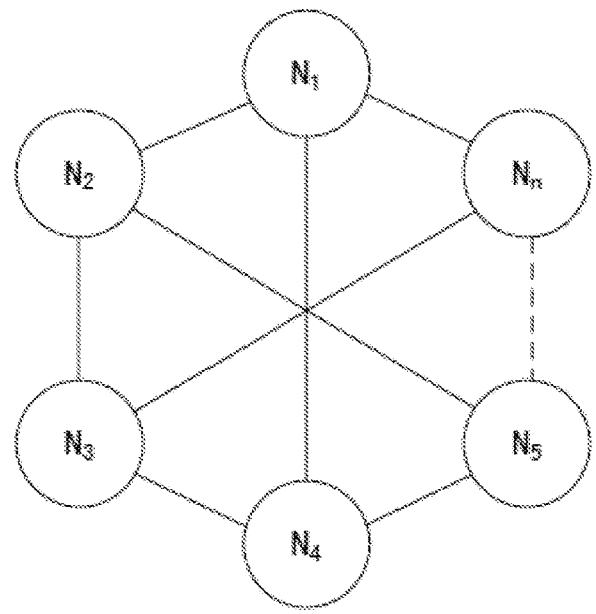
FIG. 1 is a schematic diagram illustrating a correlation among control components in an industrial control system according to an embodiment.

REFERENCE SIGNS $N_1, N_2, N_3 \ldots N_n$: $1^{st}$ $2^{nd}$, $3^{rd} \ldots n^{th}$ control components in the industrial control system,
$N_L, N_M$: $L^{th}$, $M^{th}$ control components newly added to the industrial control system,
300: root hash value of the industrial control system,
301: executing hash operation on all control components,
$300_1, 300_2 \ldots 300_{n-1}$: hash values of the control components $N_1, N_2 \ldots N_{n-1}$,
$400_1, 400_2, 400_3 \ldots 400_n$: identify features and data features of the control components $N_1, N_2 \ldots N_n$.

DETAILED DESCRIPTION

Preferred embodiments of the present disclosure will be described in more detail below with reference to the accompanying drawings. Although the drawings illustrate the preferred embodiments of the present disclosure, it should be understood that the present disclosure may be implemented in various forms and should not be limited to the embodiments illustrated herein. On the contrary, these embodiments are provided for the purpose that the present disclosure will be thorough and complete, and can fully convey the scope of the present disclosure to those skilled in the art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

According to a first aspect of the present invention, an embodiment of the present invention provides a method, including the steps of establishing a correlation between at least two control components in an industrial control system; and determining a summary indicating the integrity of data to be protected in a first control component based on identity features and data features of other control components correlated to the first control component among the plurality of control components, wherein the data features are used for identifying the data to be protected in the control components, and the first control component is any one of the plurality of control components. The summary of the data integrity protection of any control component in the present invention is determined based on the identity features and the data features of other control components correlated to the control component, and the correlation among the control components may be established according to an arbitrary rule, so if an invalid user desires to attack a data file in any control component, such as firmware or a configuration file, he must know which other control components are correlated to the control component; and, even if he knows other control components correlated to the control component, he also must know which features of these correlated control components have been utilized to determine the integrity protection summary of the control component. Therefore, the amount of computation required for the invalid user to complete the attack is huge, so that the data to be protected in the control components can be effectively protected.

According to a preferred embodiment of the present invention, determining the summary indicating the integrity of data to be protected in the first control component includes: determining a first integrity protection summary specific to the first control component, the first integrity protection summary being only used for indicating the integrity of the data to be protected in the first control component; and determining a second integrity protection summary shared by the plurality of control components including the first control component, the second integrity protection summary being used for indicating the integrity of the data to be protected in the plurality of control components. With this embodiment, when the data to be protected in any control component is attacked or damaged, the data in any of the control component in the industrial control system can be detected as being abnormal by using the second integrity protection summary, and the protected data in which control component is attacked or damaged can be determined by using the first integrity protection summary.

According to a preferred embodiment of the present invention, establishing the correlation among a plurality of control components in the industrial control system includes: ranking the plurality of control components; wherein determining the first integrity protection summary further includes: determining the first integrity protection summary of the first control component based on a first integrity protection summary of a ranked second control component next to the first control component as well as the identity feature and the data feature of the first control component, and simultaneously storing the first integrity protection summary into a control component following the first control component, wherein the first integrity protection summary of the second control component is determined based on the identity features and the data features of all other control components previous to the first control component. With this embodiment, since the integrity protection summary of the current control component is determined only based on the integrity protection summary of the previous control component which is determined in advance, not only is the amount of calculation simplified, but also the security of the current control component is established over the features of the correlated control components.

According to an embodiment, the second integrity protection summary is determined based on the identity feature and the data feature of each of the plurality of control components, and is distributed to each of the plurality of control components. The data feature used for identifying the data to be protected in each control component may include the data to be protected in the control component, such as firmware or a configuration file of the control component, and may further include creation time, i.e., time stamp, version number and other information of the configuration file or firmware. Therefore, in the industrial control system, whether the control component is replaced (which necessarily leads to the change of the identity feature) or the file is modified can be verified by using the second integrity protection summary. Moreover, each control component can be configured to monitor the entire industrial control system by storing the second integrity protection summary into each control component.

According to an embodiment, when the second integrity protection summary is determined based on the identity features and the data features of all the control components, the following process is included: dividing the plurality of control components into at least one group, and generating a temporary integrity protection summary of the group of control components based on the identity features and the data features of the respective control components in each group; and determining the second integrity protection summary based on the generated temporary integrity protection summary of each group. As the value of the integrity protection summary depends on the grouping rule, the difficulty of cracking is further increased.

According to an embodiment, when a new control component is integrated into the industrial control system, the following process is executed: executing re-ranking to arrange the new control component behind the plurality of control components; determining a first integrity protection summary of the new control component based on the first integrity protection summary of the last control component, saving the first integrity protection summary in the new control component, and saving the first integrity protection summary into the control component at the starting position as a second integrity protection summary. With the embodiment of the present invention, it is not necessary to adjust the structure of the system even when a new control component is added to the system. This embodiment does not affect the first integrity protection summary of other control components in the system, meanwhile, the first integrity protection summary of the new control component can be determined only based on the first integrity protection summary of the last control component in the original system, so that the security of the new control component is correlated to the other control components. Therefore, this embodiment is simple and efficient, and has good scalability.

According to an embodiment, when data integrity verification is executed, the following operation is executed:

extracting the data features and the identity features of all the control components in the industrial control system; re-determining the second integrity protection summary; and determining that the data to be protected in part of or all of the plurality of control components in the industrial control system changes if the re-determined second integrity protection summary does not coincide with the predetermined second integrity protection summary. Moreover, when not coinciding, the first integrity protection summary of each of the plurality of control components is re-determined; and a control component of which the data to be protected changes among the plurality of control components is determined according to the re-determined first integrity protection summary of each control component. Because of the uniqueness of the second integrity protection summary, any change to the data to be protected results in a different second integrity protection summary, so whether the data file of a control component in the system is attacked or damaged can be quickly judged. At the same time, the data to be protected in which control component changes can be accurately judged by using the first integrity protection summary, and the abnormal control component can be further reported to a user based on the extracted identity feature.

Moreover, according to an embodiment, the method of the present invention further includes the steps of detecting a change operation on the data to be protected in the first control component, wherein the change operation will result in generating updated data to be protected in the first control component; reading the first integrity protection summary in the second control component in response to the change operation; and re-determining the first integrity protection summary in the first control component based on the identity feature of the first control component, the data feature of the updated data to be protected and the first integrity protection summary of the second control component, and refusing the update of the data to be protected when the re-determined first integrity protection summary does not coincide with the predetermined first integrity protection summary. The change operation herein, for example, may replace the original data to be protected in the control component, or directly modify the original data to be protected in the control component, by using new data to be protected, such as a configuration file or firmware. With this embodiment, if it is determined that the new data to be protected (collectively referred to as 'updated data to be protected' hereinafter) caused by the data to be protected for replacement or modification operation fails to pass the integrity verification, the replacement operation or the modification on the original data can be refused, thus avoiding erroneous loading of a malicious attack to the firmware or configuration file in the control component.

According to an embodiment, the method of the present invention includes: maintaining a list storing the first integrity protection summary of each control component in the industrial control system and the second integrity protection summary; re-determining the first integrity protection summaries of the first control component and all control components behind the first control component and the second integrity protection summary when the identity feature or the data feature of the first control component changes; and updating corresponding values corresponding to the first control component and all the control components behind the first control component in the list by using the re-determined first integrity protection summaries and second integrity protection summary. This has the advantages that the list of the first integrity protection summary and the second integrity protection summary is maintained by using a central node or a control component, so as to realize centralized control and verification on the respective control components, thus facilitating the maintenance of the system.

According to a second aspect of the present invention, an embodiment of the present invention provides a data integrity protection device, including: a correlation establishment module, configured to establish a correlation among a plurality of control components in an industrial control system; and a summary generation module, configured to determine a summary indicating the integrity of data to be protected in a first control component based on identity features and data features of other control components correlated to the first control component among the plurality of control components, wherein the data features are used for identifying the data to be protected in the control components, and the first control component is any one of the plurality of control components.

In a preferred embodiment, the summary generation module includes: a module, configured to determine a first integrity protection summary specific to the first control component, the first integrity protection summary being only used for indicating the integrity of the data to be protected in the first control component; and a module, configured to determine a second integrity protection summary shared by the plurality of control components including the first control component, the second integrity protection summary being used for indicating the integrity of the data to be protected in the plurality of control components.

In a preferred embodiment, the correlation establishment module includes: a module, configured to rank the plurality of control components; and the summary generation module further determines a first integrity protection summary of the first control component based on a first integrity protection summary of a ranked second control component next to the first control component as well as the identity feature and the data feature of the first control component, and simultaneously stores the first integrity protection summary into a control component following the first control component, wherein the first integrity protection summary of the second control component is determined based on the identity features and the data features of all other control components previous to the first control component.

In a preferred embodiment, the summary generation module further includes a module, configured to store the first integrity protection summary of the last control component of the plurality of control components into the control component at the starting position of the rank as the second integrity protection summary.

In a preferred embodiment, the summary generation module further includes a module, configured to determine the second integrity protection summary based on the identity feature and the data feature of each of the plurality of control components, and distribute the second integrity protection summary to each of the plurality of control components.

In a preferred embodiment, the summary generation module further includes: a first module, configured to divide the plurality of control components into at least one group, and generate a temporary integrity protection summary of the group of control components based on the identity features and the data features of the respective control components in each group; and a second module, configured to determine the second integrity protection summary based on the generated temporary integrity protection summary of each group.

In a preferred embodiment, the summary generation module further includes: an extraction module, configured to extract the data features and the identity features of all the control components in the industrial control system; a first re-determination module, configured to re-determine the second integrity protection summary; and a comparison module, configured to determine that the data to be protected in part of or all of the plurality of control components in the industrial control system changes if the re-determined second integrity protection summary does not coincide with the predetermined second integrity protection summary.

In a preferred embodiment, when the re-determined second integrity protection summary does not coincide with the stored second integrity protection summary, the summary generation module further includes: a second re-determination module, configured to re-determine the first integrity protection summary of each of the plurality of control components; and a determination module, configured to determine a control component of which the data to be protected changes among the plurality of control components according to the re-determined first integrity protection summary of each control component.

In a preferred embodiment, the data integrity protection device further includes: a detection module, configured to detect a change operation on the data to be protected in the first control component, wherein the change operation will result in generating updated data to be protected in the first control component; a reading module, configured to read the first integrity protection summary in the second control component in response to the change operation; and a determination module, configured to re-determine the first integrity protection summary in the first control component based on the identity feature of the first control component, the data feature of the updated data to be protected and the first integrity protection summary of the second control component, and refuse the update of the data to be protected when the re-determined first integrity protection summary does not coincide with the predetermined first integrity protection summary.

In a preferred embodiment, the data integrity protection device further includes: a maintenance module, configured to maintain a list storing the first integrity protection summary of each control component in the industrial control system and the second integrity protection summary; a re-determination module, configured to re-determine the first integrity protection summaries of the first control component and all control components behind the first control component and the second integrity protection summary when the identity feature or the data feature of the first control component changes; and an update module, configured to update corresponding values corresponding to the first control component and all the control components behind the first control component in the list by using the re-determined first integrity protection summaries and second integrity protection summary.

According to a third aspect of the present invention, an embodiment of the present invention provides an industrial control system, including a first control component and at least one second control component, wherein the first control component is programmed to execute an embodiment of the generation and verification method of integrity protection summaries in the present invention. Thus, the security protection of the industrial control system can be realized by using the industrial control system itself without the intervention of external equipment. In addition, according to one embodiment of the present invention, the industrial control system may further include a central node coupled to the first control component and the second control components, wherein the central node is programmed to execute an embodiment of the generation and verification method of the integrity protection summaries in the present invention.

According to a fourth aspect of the present invention, an embodiment of the present invention provides a data integrity protection device, including: at least one memory, configured to store executable instructions; and at least one processor, configured to execute an embodiment of the method of the present invention by executing the instructions to implement generation and verification of data integrity protection summaries. Optionally, the data integrity protection device may be implemented by a central node or a control component. When the central node is adopted, centralized maintenance on the industrial control system can be facilitated, and the burden of each control component is reduced. Moreover, key components in key process flows can be monitored in real time to avoid major failures. When the device is implemented by the control component, it can be designed to periodically maintain and inspect key data of each control component in the industrial control system.

According to a fifth aspect of the present invention, an embodiment of the present invention provides a machine-readable medium, wherein instructions are stored therein, when being executed by a machine, enable the machine to execute an embodiment of the method of the present invention.

In an industrial control system, multiple control components (or control nodes) are usually arranged on a production line, such as a PLC, an OPC UA, an SCADA, etc. In order to better protect the security of data in these control components, for example, to prevent the damaged firmware and configuration file from being used or prevent the firmware and configuration file from being tampered, the data integrity protection embodiment proposed by the present invention is to establish the data security of one control component over the features of other correlated control components, and generate a summary indicating the integrity of the data to be protected in the current control component by using the inherent feature information of the other control components. It should be pointed out that the 'correlation' here does not necessarily refers to a correlation of necessary operation processes among the control components on the production line, but can be randomly specified in advance.

Integrity Summary Generation

According to at least one embodiment of the present invention, in order to establish an industrial control system and an integrity protection summary of each control component in the system, it needs to establish a correlation among the control components in the industrial control system. FIG. 1 shows n control components in an industrial control system (ICS) in the form of grids, as an example. Taking the control component $N_4$ as an example, the control components correlated to it may be selectively defined as $N_1$, $N_3$ and $N_5$, or $N_3$, $N_2$ and $N_1$, or two adjacent control components $N_3$ and $N_5$. After the relevant control components of the control component $N_4$ is determined according to a predetermined selection method, fingerprints or a summary, for indicating the integrity of data to be protected in the control component $N_4$, of the control component $N_4$ can be calculated based on the inherent features of these relevant control components. It should be noted here that the inherent features of the other relevant control components, upon which the fingerprints of $N_4$ are calculated, include but not limited to identity features or data features, or other feature information generated based on the identity features and the data features. The identity feature refers to an identification feature for uniquely identifying a control component, e.g., a device ID, a network MAC address, etc. The data feature may be used for identifying data to be protected in the control component. For example, the data feature may be a feature that uniquely identifies the data to be protected in the control component. The data to be protected here may be firmware, a configuration file and the like, the data feature may be one of or a combination of multiple of content, version number and/or time stamp of the firmware/configuration file and the like, and the time stamp herein may refer to a creation time of the firmware or a creation or modification time of the configuration file. In the following description, as an example, the data feature of the control component is represented by the combination of the content of the firmware, and the content, version number and time stamp of the configuration file.

Moreover, in at least one embodiment of the present invention, the fingerprints or summary for indicating the integrity of the data to be protected may be generated by adopting a technology known in the art, for example, adopting a hash function to calculate a hash value for the identity feature and file feature of the control component, and such a hash function may be, for example, any one-way function known in the art, such as MD5, DES, RSA, etc. In the following disclosure, the embodiments of the present invention are described by taking the hash value as an example.

Figure 2:
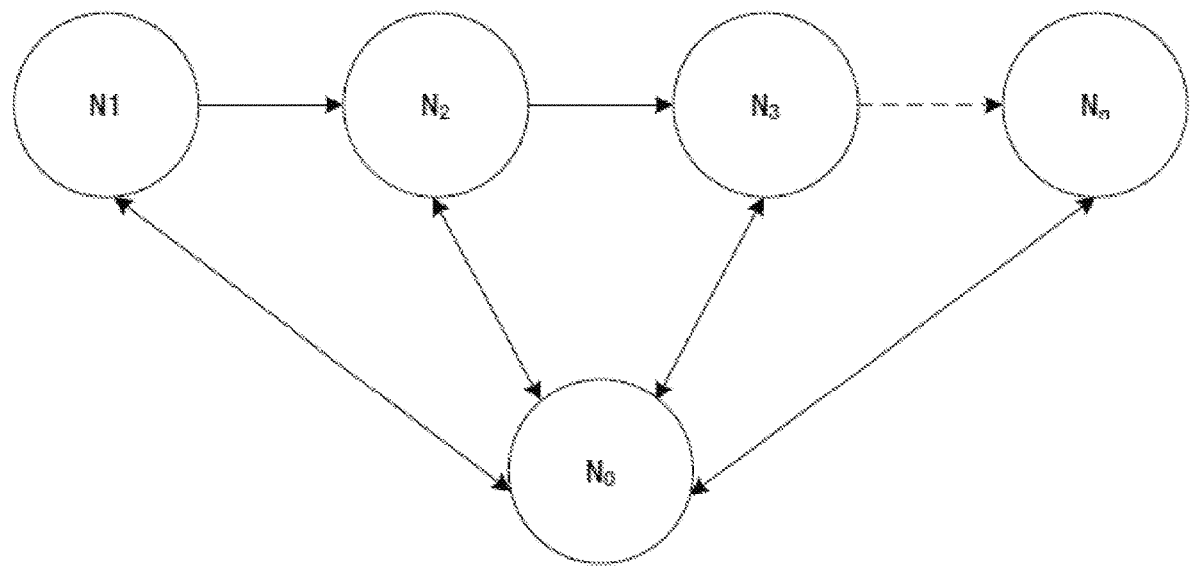
FIG. 2 shows a schematic diagram of an integrity protection system according to an embodiment.

FIG. 2 shows a schematic diagram of a data integrity protection system according to an embodiment. As shown in FIG. 2, the system includes a central node $N_0$ and control components $N_1, N_2, N_3 \ldots N_n$. The central node $N_0$ may be connected to each control component in a wired or wireless manner, and may access the information stored in each control component, wherein the information includes the identity feature and the data feature of each control component. The n control components are ranked by the central node $N_0$, as shown by the arrows among $N_1, N_2 \ldots N_n$ in FIG. 2. After ranking, each control component is correlated to all the control components in front. Subsequently, the central node $N_0$ may calculate a hash value of $N_1$ based on the features of $N_1$ itself as an integrity protection summary of $N_1$. The central node $N_0$ may calculate a hash value of $N_2$ based on the features of $N_1$ as an integrity protection summary of $N_2$. The central node $N_0$ may calculate a hash value of $N_3$ based on the features of $N_1$ and $N_2$ as an integrity protection summary of $N_3$. The central node $N_0$ may calculate a hash value of $N_4$ based on the features of $N_1$, $N_2$ and $N_3$ as an integrity protection summary of $N_4$. By parity of reasoning, the hash value of the last control component $N_n$ is calculated based on the features of all the previous control components. Obviously, for the latter control component, it depends on more previous control components when calculating, so the quantity of computation is larger, and the difficulty of tampering data is also increased. For example, compared with the case that the control component $N_2$ only needs the feature information of $N_1$, not only the information of $N_1$ and $N_2$ but also the information of $N_3$ are needed to calculate the integrity protection summary of the control component $N_4$, thereby increasing the difficulty of cracking.

Figure 3:
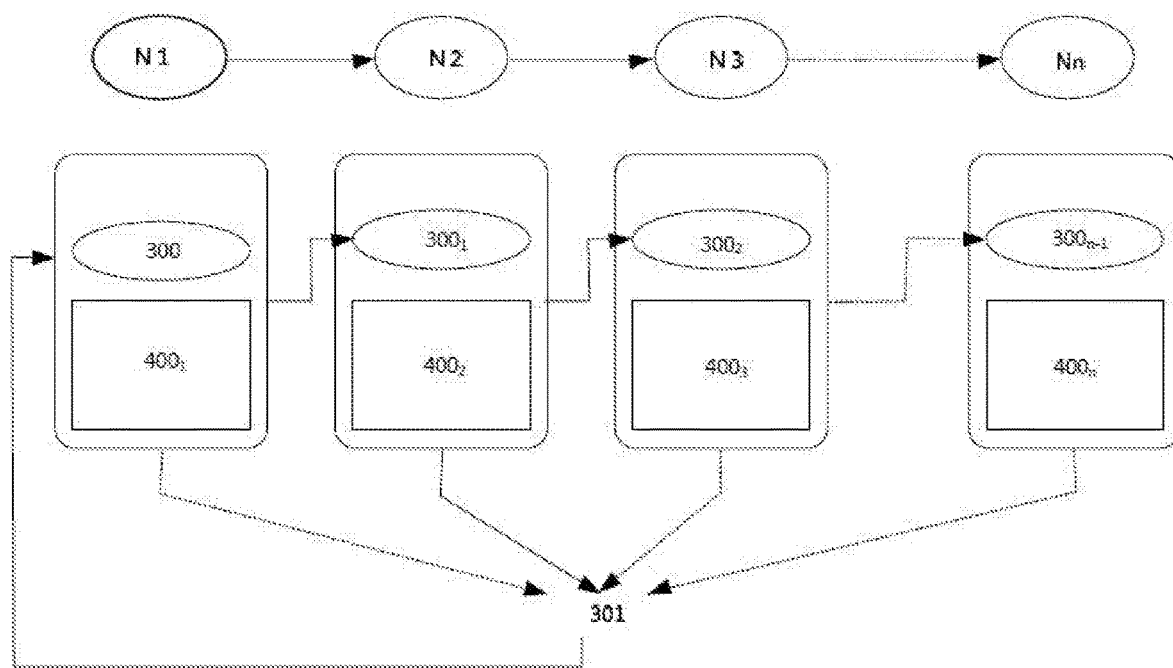
FIG. 3 shows a schematic diagram of establishing a correlation among control components in an industrial control system according to an embodiment.

In order to avoid increasing the burden on the central node $N_0$ due to an excessive amount of computation without reducing the degree of security, the central node calculates the integrity protection summary of the latter control component by using the integrity protection summary generated for the previous control component in a preferred embodiment of the present invention. As shown in FIG. 3, a mark 400 collectively shows the identity feature of each control component and the data feature of the firmware or configuration file, serving as the data to be protected, in the control component in this example. The central node $N_0$ calculates a hash value $H(N_1)$ by using a hash function for the identify feature, such as ID, of the control component $N_1$ and the data feature, such as the content of the firmware, and the content, time stamp T1 and version number V1 of the configuration file (shown as mark $400_1$ in the figure), i.e., $H(N_1)=Hash(T(N_1)|T(N_1))$, wherein $T(N_1)$ is a function of the identify feature such as ID1, firmware content FW1 or configuration file content CF1 as well as time stamp T1 and version number V1 thereof, for example, a symbol expression or list is generated from the ID1 as well as the content, time stamp T1 and version number V1 of the firmware/configuration file according to certain rules. The central node $N_0$ generates an integrity protection summary $H(N_1)$ correlated to the generation time of the data file by using a one-way hash function based on the symbol expression or list, and stores the hash value $H(N_1)$ as an integrity protection summary of the first control component $N_1$. As an option, the hash value $H(N_1)$ of the first control component $N_1$ may also be stored into the first control component $N_1$, and also stored into the second control component $N_2$, as shown by $300_1$ in the figure.

Subsequently, for the control component $N_2$, the central node $N_0$ calculates a hash value $H(N_2)$ based on the hash value $H(N_1)$ of the first control component $N_1$, the identity feature ID2 of the control component $N_2$, the firmware content FW2 and configuration file content CF2 as well as time stamp T2 and version number V2 (shown as mark $400_2$ in the figure) thereof, i.e., $H(N_2)=Hash(H(N_1)|T(N_2))$. Then, the central node $N_0$ stores the hash value $H(N_2)$ of the second control component $N_2$ into the second control component $N_2$ as an integrity protection summary of the second control component $N_2$, and may also store it into the third control component $N_3$, as shown by $300_2$ in the figure. The central node $N_0$ repeats the above process until the last node $N_n$. After the central node $N_0$ calculates the hash value of $N_n$ by using $H(N_n)=Hash(H(N_{n-1})|T(N_n))$, the hash value is used as an integrity protection summary of the last component $N_n$, while the last control component $N_n$ also stores the hash value $300_{n-1}$ of the previous control component $N_{n-1}$. Because of the difference of the identity feature and the data feature of each control component and the characteristics of the hash function, the hash value $H(N)$ generated for each control component varies. In addition, since the hash value $H(N)$ of each control component is substantially calculated via stepwise hashing based on the identity feature and the data feature of each control component in front, the data change of any previous control component will result in the difference of the hash value of each following control component, that is, the data integrity changes.

In another embodiment, the central node $N_0$ may further generate a common integrity protection summary $H(C)$ for all the control components in the industrial control system besides the integrity protection summary $H(N)$ special for each control component, wherein the $H(C)$ reflects the features of all the control components, in particular, the data to be protected in each component. Thus, as an example, the central node $N_0$ takes the hash value $H(Nn)$ of the last control component $N_n$ as the integrity protection summary $H(C)$ of the industrial control system, and stores it into the first component $N_1$. The first component at this time is also referred to as a head node, and the stored hash value is marked as a root hash value, as shown by 300 in the figure. In another example, as shown in FIG. 3, the central node $N_0$ may execute a hash operation again on the identity features and the data features of the n control components, as shown by 301. The central node may distribute the calculated integrity protection summary H(C) to one of or all of the control components $N_1$, $N_2$ ... Nn to facilitate later data integrity verification.

Figure 4:
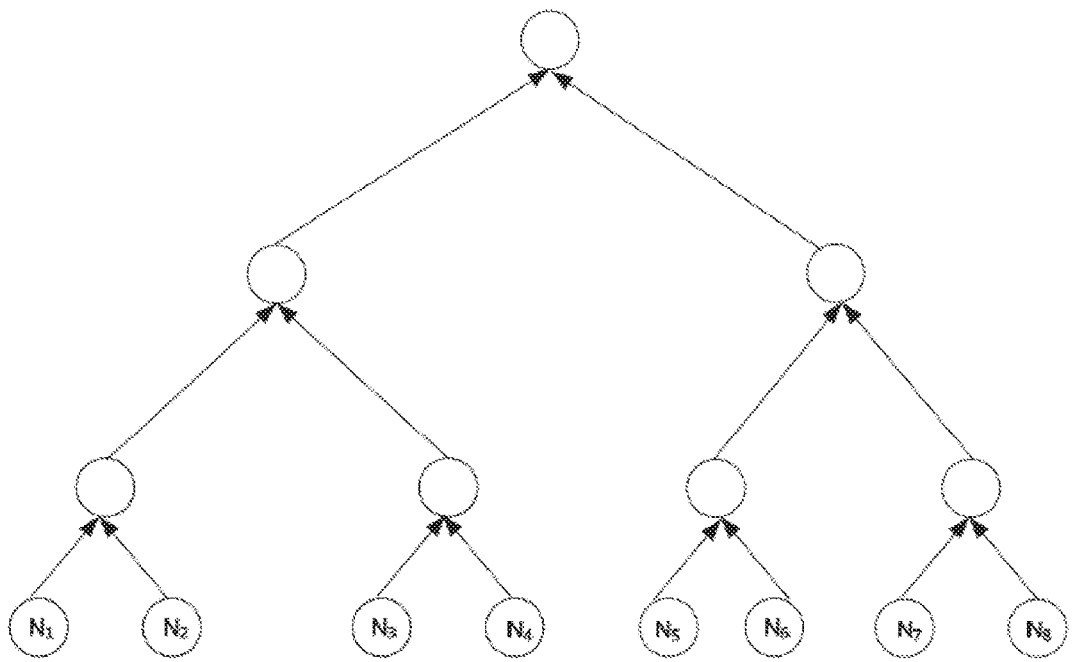
FIG. 4 shows a schematic diagram of calculating an integrity protection summary in a grouping manner according to an embodiment.

FIG. 4 shows an example that the central node $N_0$ calculates the H(C) based on the identity features and the data features of the n control components by using a grouping operation method according to an embodiment of the present invention. For the convenience of illustration, totally eight control components are shown in the figure. As shown in the figure, the central node firstly performs primary grouping to divide the eight components into four groups with each including two. Then, the central node calculates hash values for the identity features and the data features of the two control components of each group respectively to obtain temporary feature hash values $Hash(N_1|N_2)$, $Hash(N_3|N_4)$, $Hash(N_5|N_6)$ and $Hash(N_7|N_8)$ of all groups on a first level. Next, the central node executes the iterative hash operation again to carry out secondary grouping on the obtained hash values of each group, and executes the hash operation again on the temporary hash values $Hash(N_1|N_2)$ and $Hash(N_3|N_4)$ of the first group and the temporary hash values $Hash(N_5|N_6)$ and $Hash(N_7|N_8)$ of the second group on the first level to obtain temporary hash values on a second level:

$Hash(((Hash(N_1|N_2))|(Hash(N_3|N_4)))$ and
$Hash(((Hash(N_5|N_6))|(Hash(N_7|N_8)))$.

Finally, the central node iteratively calculates a root hash value $H(C)=Hash((Hash(((Hash(N_1|N_2))|(Hash(N_3|N_4))))|(Hash(((Hash(N_5|N_6))|(Hash(N_7|N_8))))))$ based on the two hash values on the second level. It can be seen that the finally calculated root hash value H(C) includes the features of all the control components. Thus, the change of the data to be protected in any control component will result in the difference of the calculated root hash value, that is, the integrity of the data is damaged.

Figure 5:
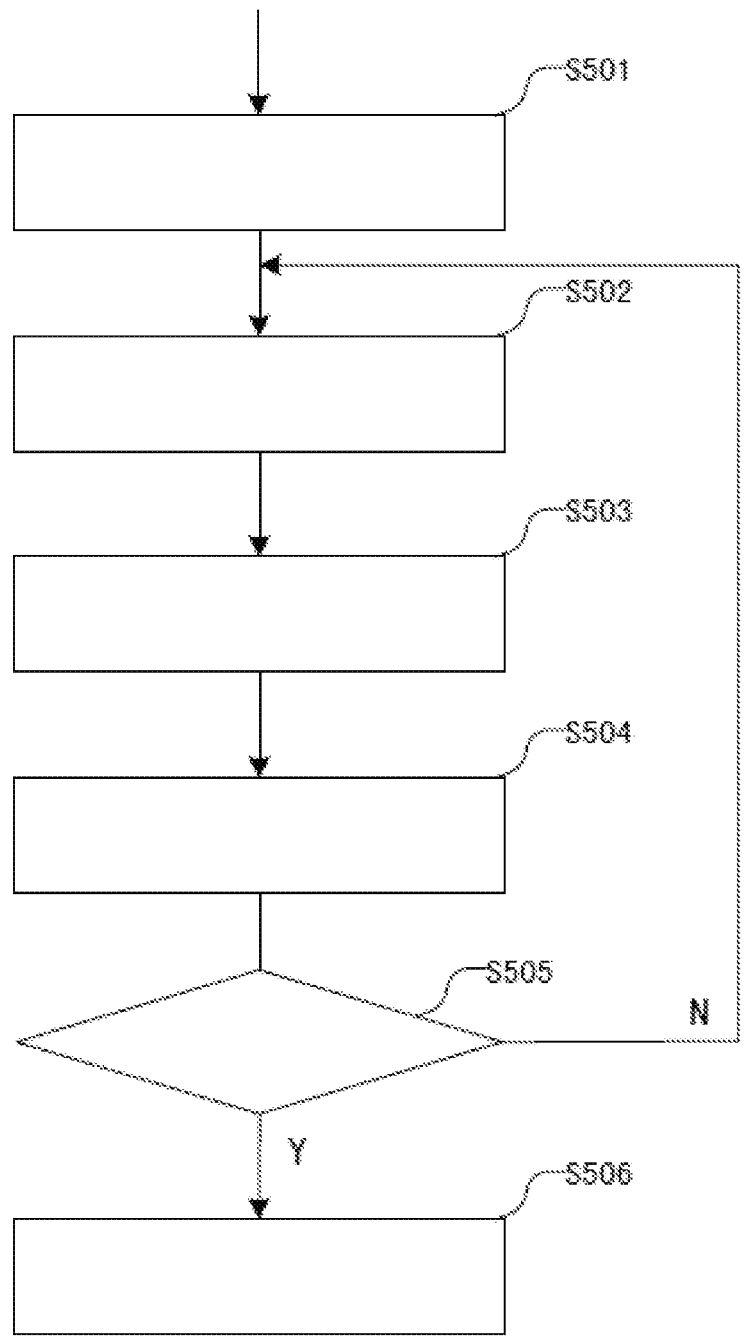
FIG. 5 shows a flow diagram of calculating an integrity protection summary according to an embodiment.

FIG. 5 shows an example flow diagram of generating an integrity protection summary for a control component. As shown in FIG. 5, first, step S501, rank the plurality of control components in the industrial control system to specify that the integrity of each control component depends on one or more previous control components. Step S502, read the features of the previous control components for the current $m^{th}$ control component (m≤n). The features here may be identity features and data features that are inherent features of the control components, in which case the read features of the previous control components should be the ones of all (m−1) correlated control components previous to the current component. Or, the read features of the previous control components may also be integrity protection summaries, in which case only the integrity protection summary of the $(m-1)^{th}$ component next to the current control component needs to be read.

Step S503, calculate the hash value of the current control component based on the read features of the previous control components and the identity feature and data feature of the current control component. Under the condition that the read features of the previous control components are identity features and data features of all (m−1) correlated control components previous to the current component, the hash value of the current control component may be calculated by using the grouping operation method described above. Under the condition that the read feature is the hash value of the $(m-1)^{th}$ control component, the hash value $H(N_m)$ of the current control component is directly calculated based on the hash value $H(N_{m-1})$ of the previous control component and the identity feature and data feature of the current control component.

Step S504, store the calculated hash value $H(N_m)$ of the current control component into the control component m and the control component (m+1). Then, step S505, determine whether the current control component is the last component or not. If the last component does not arrive, the calculated hash value $H(N_m)$ of the current control component is stored into the next control component (m+1), the hash value of the next control component (m+1) is successively calculated, then go back to step S502 to read the features of the component (m+1), and steps S502 to S505 are repeated until the hash value $H(N_n)$ of the last control component is calculated. If the last control component is determined to arrive and the hash value $H(N_n)$ is calculated in step S505, step S506 is executed. In this step, the hash value $H(N_n)$ is stored into the first control component $N_1$ as a root hash value, and the process is ended. Optionally, in step 506, a hash operation on the identity features and the data features of all the n components is executed via the grouping operation described above, so as to determine a different root hash value H(C), and distribute the root hash value H(C) to the first control component or all the control components.

Add New Control Nodes

Figure 6:
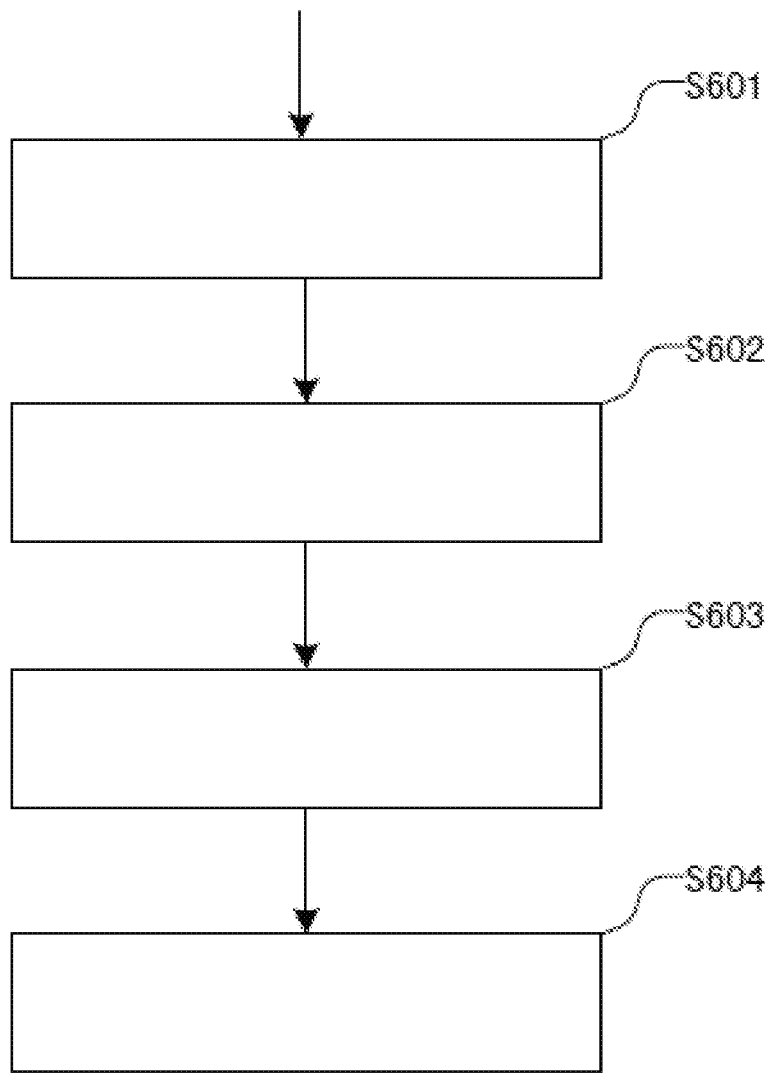
FIG. 6 shows a flow diagram of calculating an integrity protection summary according to another embodiment.

FIG. 6 shows a flow diagram of generating a security protection summary when a new control component is added to the industrial control system. As shown in FIG. 6, step S601, add a new control component to the set of n control components of the original control system. Step S602, establish a correlation among the new control component and other control components. In this embodiment, the new component is arranged at the tail end of the n components and designated as the $(n+1)^{th}$ component. Then, step S603, calculate a first integrity protection summary of the $(n+1)^{th}$ component, for example, execute a hash operation $H(N_{n+1})=Hash(H(N_n)|(N_{n+1}))$ on the first integrity protection summary of the $n^{th}$ component and the identity feature and data feature of the $(n+1)^{th}$ component, thus generating the first integrity protection summary of the $(n+1)^{th}$ component. Next, step S604, update the root hash value 300 stored in the control component $N_1$, i.e., a second integrity protection summary, by using the H(Nn+1).

Figure 7:
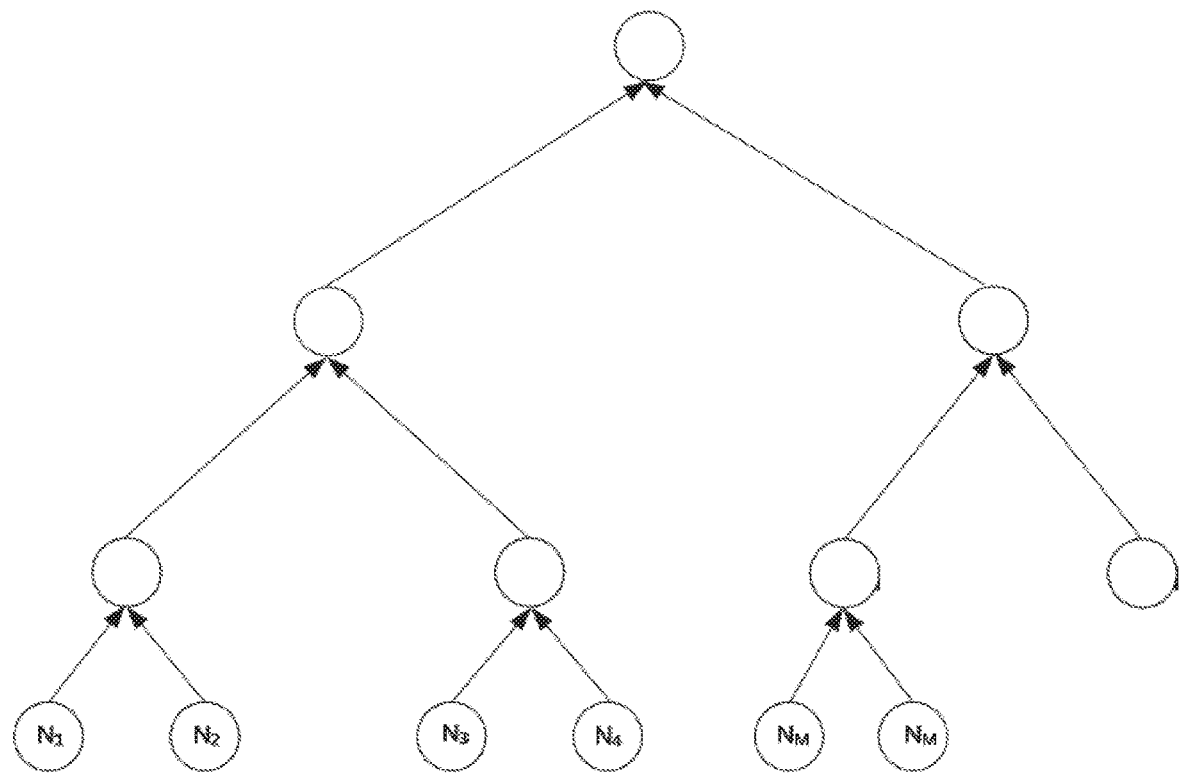
FIGS. 7 and 8 show schematic diagrams of calculating an integrity protection summary in a grouping manner according to another embodiment.

In another embodiment, when a new control component is added to the industrial control system, the root hash value RH of the industrial control system may also be calculated by using the grouping operation as described above. FIG. 7 shows a situation that four control components exist in an industrial control system as an example. The root hash value $H(C)=Hash(((Hash(N_1|N_2))|(Hash(N_3|N_4)))$ of the control system is obtained by a hash operation of two-level iteration of the four control components. Therefore, two times of hash operation are also needed for the newly added control component. As shown in FIG. 7, when only one new control component (expressed by $N_M$) is desired to be added to the industrial control system, a hash operation is executed by using the features of the new control component and the new control component itself to obtain a first-level hash calculation value $Hash(N_M|N_M)$. Then, a second-level hash operation of the new control component is executed on the first-level hash calculation value $Hash(N_M|N_M)$, i.e., $Hash((Hash(N_M|N_M))|(Hash(N_M|N_M)))$. Finally, a hash operation is executed again on the second-level hash value of the new control component and the original root hash value of the industrial control system, i.e., $H'(C)=Hash((Hash(((Hash(N_1|N_2))|(Hash(N_3|N_4))))|(Hash((Hash(N_M|N_M))|(Hash(N_M|N_M)))))$. The original H(C) is updated with the new hash value H'(C) to obtain a new root hash value 300 of the industrial control system.

Figure 8:
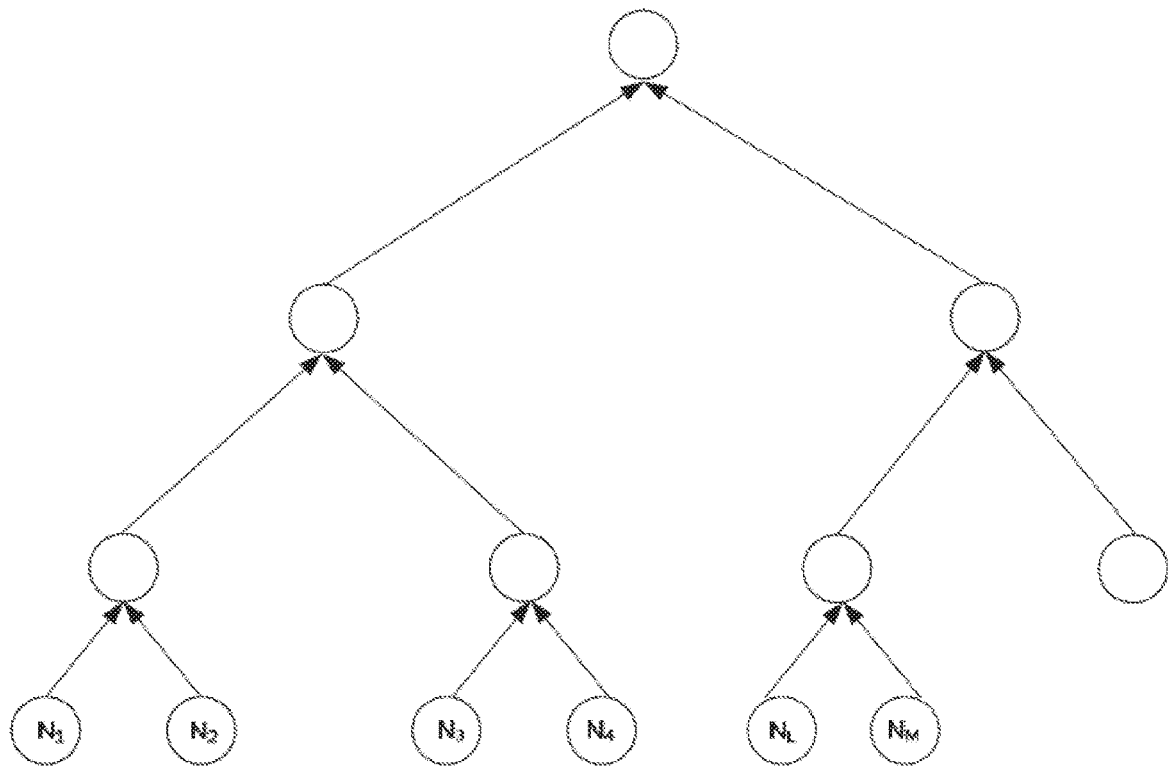

In another embodiment, as shown in FIG. 8, when two new control components (expressed by $N_L$ and $N_M$) are desired to be added to the industrial control system, the features of the new control components are divided into a group, and a hash value of the both is calculated to obtain a first-level hash calculation value Hash($N_M|N_L$). Then, a second-level hash operation of the new control components is executed on the first-level hash calculation value Hash($N_M|N_L$), i.e., Hash((Hash($N_M|N_L$))|(Hash($N_M|N_L$))). Finally, a hash operation is executed again on the second-level hash value of the two new control components and the original root hash value of the industrial control system, i.e., H'(C)=Hash((Hash(((Hash($N_1|N_2$))|(Hash($N_3|N_4$))))|(Hash((Hash($N_M|N_L$))|(Hash($N_M|N_L$))))). The original H(C) is updated with the new hash value H'(C) to obtain a new root hash value 300 of the industrial control system. It is not hard to understand that the addition of a plurality of new control components still can be processed according to the above grouping manner.

Integrity Verification

After the central node $N_0$ generates an exclusive first integrity protection summary and a common second integrity protection summary for each of the control components $N_1$-$N_n$, the central node $N_0$ or the control component can verify the integrity of the data to be protected by using these integrity protection summaries.

In one embodiment, as shown in FIG. 4, when it is desired to verify whether the data of a configuration file or firmware at the position $N_4$ of a production line is changed or damaged or not, the control component $N_4$ recalculates the first integrity protection summary of the control component $N_4$ according to user's indication by using the first integrity protection summary stored by it in the previous control component $N_3$ and the data feature and identity feature including data to be protected in the control component $N_4$. If the recalculated first integrity protection summary does not coincide with the stored first integrity protection summary, it indicates that the data in the control component $N_4$ is changed, for example, damaged or tampered. The above process of verifying whether the data in the control component $N_4$ changes or not by using the first integrity protection summary is completed by the control component $N_4$ itself, and obviously, may also be implemented by the central node. Moreover, according to an embodiment of the present invention, the verification executed by the control component may be triggered when the control component detects a change operation on the firmware or configuration file therein, for example, when detecting that the original data to be protected in the control component is being attempted to be replaced with new data, or when detecting that the original data to be protected is attempted to be modified. In addition, the replacement or modification operation, for example, may be accepted or refused according to a verification result, or an alarm prompt is sent to the control center or a user when the verification fails, thus avoiding unauthorized or incorrect operation on the data to be protected in the control component.

Figure 9:
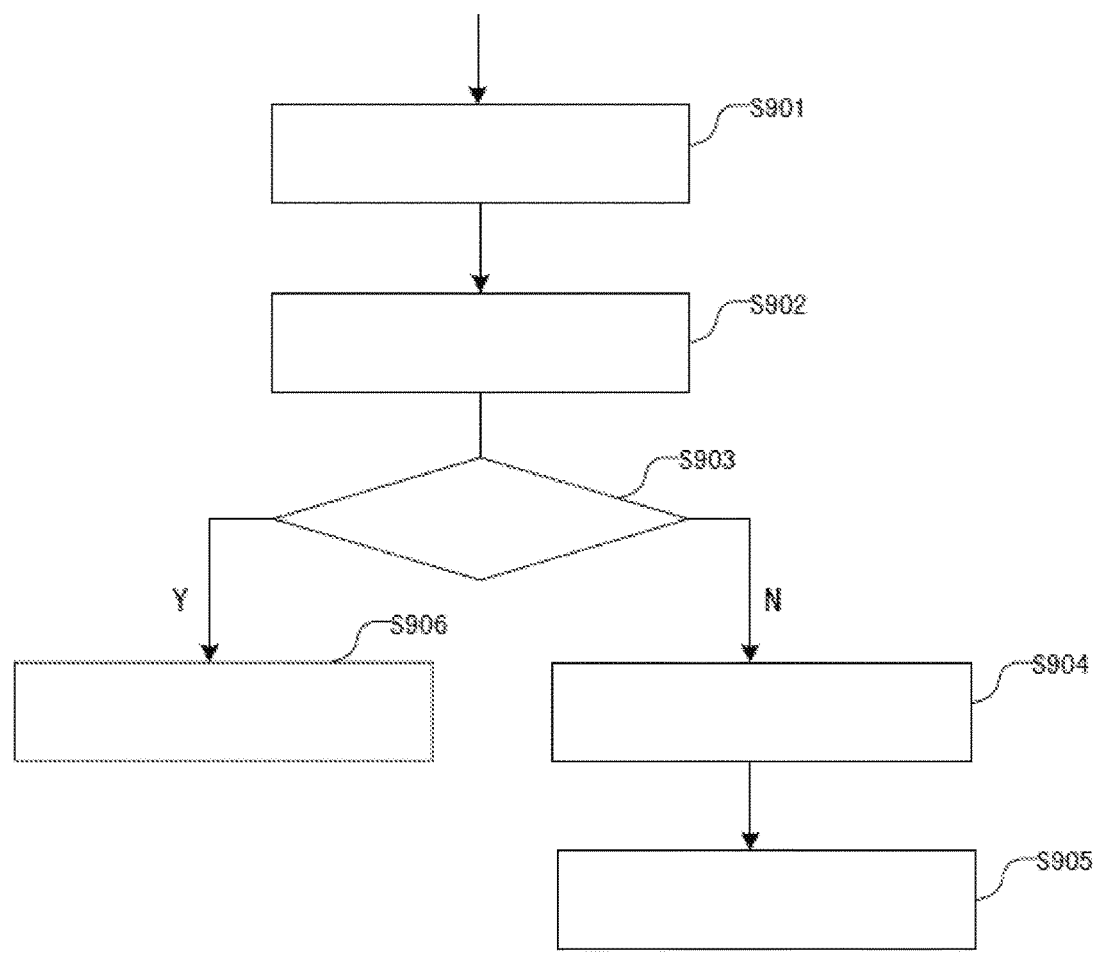
FIG. 9 shows a flow diagram of verifying an integrity protection summary according to an embodiment.

In another embodiment, the central node may also be used for determining whether the data in the industrial control system changes or not by verifying the second integrity protection summary of the industrial control system. As shown in FIG. 9, step S901, the central node extracts data features and identity features including data to be protected in all control components of the industrial control system. Step S902, the central node recalculates the second integrity protection summary of the system, e.g., the root hash value 300. Step S903, the central node judges whether the recalculated second integrity protection summary coincides with the stored second integrity protection summary or not; if coinciding, it indicates that each control component in the system and the firmware or configuration file thereof are normal and are not damaged or modified, then a signal about that the system is normal is output to the user in step S906; and if not coinciding, it indicates that the data of one or more control components in the industrial control system changes, the central node may further determine the data in which control component changes. Thus, the central node further recalculates the first integrity protection summary of each control component in step S904, and then executes matching in step S905, i.e., matching the recalculated first integrity protection summary with the stored first integrity protection summary of the corresponding control component, if matching, it indicates that the control component is normal; if not matching, it indicates that the data in the control component changes, and the central node can determine the control component having the data change according to the extracted identity feature information, and then notifies the user of the control component having data abnormality.

Since the data change in any control component results in inconsistence of the second integrity protection summaries, the central node should verify the data integrity of all the control components in the industrial control system to find all the control components that may have data changes. Thus, when it is determined that, for example, the file data in the $m^{th}$ control component is abnormal, the central node may further replace the abnormal file in the $m^{th}$ control component with normal data and then recalculate the second integrity protection summary. If the recalculated second integrity protection summary coincides with the stored second integrity protection summary, it indicates that the data of all the control components in the entire industrial control system is normal. If they still do not coincide, it indicates that the data of some other control components in the system is abnormal. Then, starting from the $(m+1)^{th}$ control component, the above process is repeated to calculate the first integrity protection summary of each control component, thus determining all the control components that may have data abnormality. In a preferred embodiment of the present invention, since the latter control component stores the first integrity protection summary of the previous control component, the central node may also instruct each control component to execute calculation and comparison of the first integrity protection summary on the firmware or configuration file thereof by itself based on the stored first integrity protection summary of the previous control component, and to report the comparison result to the central node. Thus, the central node can quickly learn the information of all the control components that having abnormality.

The central node $N_0$ of at least one embodiment of the present invention may be independent from the industrial control system, or be implemented by other component different from the control components $N_1, N_2 \ldots N_n$ in the industrial control system. By using the central node independent from the industrial control system to calculate the second integrity protection summary of the industrial control system or the first integrity protection summary of each key control component in real time, the control components on the production line can be monitored in real time, so the central node is particularly suitable for critical process sections, that is, minor change or damage to the firmware or configuration files in the control components will result in a cessation or incorrect operation of the process; and the central node is also suitable for the process sections that may cause personal injury, such as cranes, boom controls, turbines speed control and other occasions. Moreover, the second integrity protection summary and the first integrity protection summaries of the industrial control system may also be configured to be periodically determined by the control components in the system so as to achieve general maintenance on the control components in the industrial control system.

Figure 10:
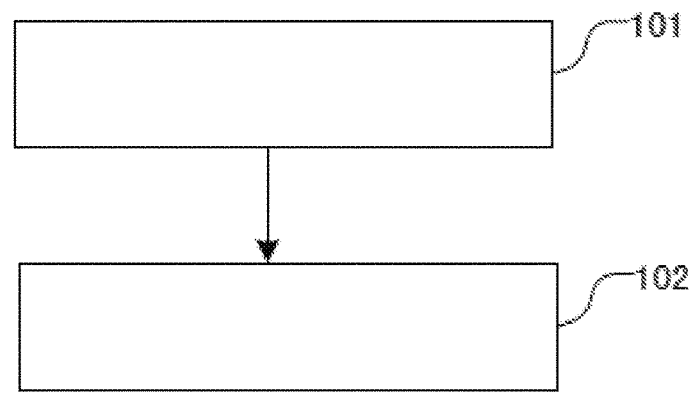
FIG. 10 shows a schematic diagram of a data integrity protection device according to an embodiment.

The example embodiments of the present invention are described above in combination with examples. Understandably, the method or the central node disclosed herein may be implemented by software, hardware or a combination of hardware and software. FIG. 10 shows a data integrity protection device implemented by program modules or hardware modules according to an embodiment of the present invention. As shown in FIG. 10, the data integrity protection device includes a correlation establishment module 101 and a summary generation module 102. The correlation establishment module 101 is configured to establish a correlation among a plurality of control components in an industrial control system, e.g., to rank the n control components, so that the data integrity summary generated for each control component is only correlated to one or all of the control components previous to the control component. The summary generation module 102 is configured to determine a summary indicating the integrity of data to be protected in the $k^{th}$ control component based on identity features and data features of other control components correlated to any control component (e.g., the $k^{th}$ control component among the n control components) among the n control components.

In an embodiment, the summary generation module 102 may include: a module, configured to determine a first integrity protection summary specific to the first control component, the first integrity protection summary being only used for indicating the integrity of the data to be protected in the first control component; and a module, configured to determine a second integrity protection summary shared by the n control components including the first control component, the second integrity protection summary being used for indicating the integrity of the data to be protected in the n control components. In an embodiment, the correlation establishment module 101 includes: a module, configured to rank the n control components; and the summary generation module 102 further determines a first integrity protection summary of the $k^{th}$ control component based on a first integrity protection summary of the ranked $(k-1)^{th}$ control component just previous to the $k^{th}$ control component as well as the identity feature and the data feature of the $k^{th}$ control component, and simultaneously stores the first integrity protection summary into the $(k+1)^{th}$ control component following the $k^{th}$ control component, wherein the first integrity protection summary of the $(k-1)^{th}$ control component is determined based on the identity features and the data features of the $P^t$ to $(k-1)^{th}$ control components. In an embodiment, the summary generation module 102 further includes a module, configured to store the first integrity protection summary of the last control component of the n control components into the control component at the starting position of the rank as the second integrity protection summary.

In an embodiment, the summary generation module 102 further includes a module, configured to determine the second integrity protection summary based on the identity feature and the data feature of each of the n control components, and distribute the second integrity protection summary to each of the n control components. In an embodiment, the summary generation module 102 further includes: a first module, configured to divide the n control components into at least one group, and generate a temporary integrity protection summary of the group of control components based on the identity features and the data features of the respective control components in each group; and a second module, configured to determine the second integrity protection summary based on the generated temporary integrity protection summary of each group. In an embodiment, the summary generation module 102 further includes: an extraction module, configured to extract the data features and the identity features of all the control components in the industrial control system; a first re-determination module, configured to re-determine the second integrity protection summary; and a comparison module, configured to determine that the data to be protected in part of or all of the n control components in the industrial control system changes if the re-determined second integrity protection summary does not coincide with the predetermined second integrity protection summary. In an embodiment, when the re-determined second integrity protection summary does not coincide with the stored second integrity protection summary, the summary generation module 102 further includes: a second re-determination module, configured to re-determine the first integrity protection summary of each of the n control components; and a determination module, configured to determine a control component of which data to be protected changes among the n control components according to the re-determined first integrity protection summary of each control component.

In an embodiment, the data integrity protection device further includes: a detection module, configured to detect a change operation on the data to be protected in the first control component, wherein the change operation will result in generating updated data to be protected in the first control component; a reading module, configured to read the first integrity protection summary in the second control component in response to the change operation; and a determination module, configured to re-determine the first integrity protection summary in the first control component based on the identity feature of the first control component, the data feature of the updated data to be protected and the first integrity protection summary of the second control component, and refuse the update of the data to be protected when the re-determined first integrity protection summary does not coincide with the predetermined first integrity protection summary. In an embodiment, the data integrity protection device further includes: a maintenance module, configured to maintain a list storing the first integrity protection summary of each control component in the industrial control system and the second integrity protection summary; a re-determination module, configured to re-determine the first integrity protection summaries of the first control component and all control components behind the first control component and the second integrity protection summary when the identity feature or the data feature of the first control component changes; and an update module, configured to update corresponding values corresponding to the first control component and all the control components behind the first control component in the list by using the re-determined first integrity protection summaries and second integrity protection summary.

In addition, the method of at least one embodiment of the present invention may also be implemented by a machine through executing instructions stored in a machine-readable medium. Moreover, the data integrity protection device according to at least one embodiment of the present invention may include a storage system configured to store executable instructions and a processing system configured to implement the method of at least one embodiment of the present invention by executing the instructions. It is not difficult to understand that the data integrity protection device may be a central node or a single control component in an industrial control system, and may also be implemented by multiple devices or machines or a network consisting of them. Thus, the storage system herein may refer to a memory, or be implemented by multiple memories distributed on different devices or machines. The processing system may be implemented by a single processor or multiple processors on a single device or machine, or by one or more processors located on different devices or machines.

It should be noted that not all steps in the methods and processes described herein are necessary, and some steps may be omitted according to actual needs. The execution sequence of each step is not fixed, and can be adjusted as needed. The present invention is described and illustrated in detail above with reference to the accompanying drawings and the preferred embodiments. However, the present invention is not limited to the disclosed embodiments. On the basis of the above-mentioned multiple embodiments, those skilled in the art can know that more embodiments of the present invention may be obtained in combination with the code review method(s)/device(s) in different embodiments above, and these embodiments also fall within the protection scope of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A data integrity protection method, comprising:
   establishing a correlation among a plurality of control components in an industrial control system; and
   determining a summary indicating an integrity of data to be protected in a first control component based on identity features and data features of other control components correlated to the first control component among the plurality of control components, wherein the data features are used for identifying the data to be protected in the control components, and the first control component is any one of the plurality of control components, wherein the determining of the summary indicating the integrity of data to be protected in the first control component includes:
   determining a first integrity protection summary specific to the first control component, the first integrity protection summary being only used for indicating the integrity of the data to be protected in the first control component, and
   determining a second integrity protection summary shared by the plurality of control components including the first control component, the second integrity protection summary being used for indicating the integrity of the data to be protected in the plurality of control components further comprising:
   determining the second integrity protection summary based on an identity feature from among the identity features of each of the plurality of control components, and based on a data feature from among the data features of each of the plurality of control components, and distributing the second integrity protection summary to each of the plurality of control components.

2. The method of claim 1, wherein,
   the establishing of the correlation among a plurality of control components in the industrial control system comprises: ranking the plurality of control components; and
   wherein the determining of the first integrity protection summary further comprises:
   determining the first integrity protection summary of the first control component based on a first integrity protection summary of a ranked second control component next to the first control component, the identity feature and the data feature of the first control component, and simultaneously storing the first integrity protection summary into a control component following the first control component, wherein the first integrity protection summary of the second control component is determined based on the identity features and the data features of all other control components previous to the first control component.

3. The method of claim 2, wherein the first integrity protection summary of the last control component of the plurality of control components is stored into the control component at a starting position of the rank as a second integrity protection summary.

4. The method of claim 1, further comprising:
   dividing the plurality of control components into at least one group, and generating a temporary integrity protection summary of a group of control components based on the identity features and the data features of the respective control components in each group; and
   determining the second integrity protection summary based on generated temporary integrity protection summary of each group.

5. The method of claim 1, further comprising:
   extracting the data features and the identity features of all the control components in the industrial control system;
   re-determining the second integrity protection summary; and
   determining that the data to be protected in part of or all of the plurality of control components in industrial control system changes upon the second integrity protection summary, re-determined, not coinciding with the second integrity protection summary.

6. The method of claim 5, further comprising:
upon the second integrity protection summary, re-determined, not coinciding with the stored second integrity protection summary,
re-determining the first integrity protection summary of each of the plurality of control components; and
determining a control component of which the data to be protected changes among the plurality of control components according to the first integrity protection summary, re-determined, of each control component.

7. The method of claim 2, further comprising:
detecting a change operation on the data to be protected in the first control component, wherein the change operation will result in generating updated data to be protected in the first control component;
reading the first integrity protection summary in the second control component in response to the change operation; and
re-determining the first integrity protection summary in the first control component based on the identity feature of the first control component, the data feature of the updated data to be protected and the first integrity protection summary of the second control component, and refusing the update of the data to be protected upon the first integrity protection summary, re-determined, not coinciding with the first integrity protection summary.

8. The method of claim 1, further comprising:
maintaining a list storing the first integrity protection summary of each control component in the industrial control system and the second integrity protection summary,
re-determining the first integrity protection summaries of the first control component and all control components behind the first control component and the second integrity protection summary upon the identity feature or the data feature of the first control component changing, and
updating corresponding values corresponding to the first control component and all the control components behind the first control component in the list by using the first integrity protection summaries and second integrity protection summary, re-determined.

9. A data integrity protection device, comprising:
at least one memory, configured to store executable instructions; and
at least one processor, upon execution of the executable instructions, configured to:
establish a correlation among a plurality of control components in an industrial control system; and
determine a summary indicating integrity of data to be protected in a first control component based on identity features and data features of other control components correlated to the first control component among the plurality of control components, wherein the data features are used for identifying the data to be protected in the control components, and the first control component is any one of the plurality of control components, wherein the at least one processor is further, upon execution of the executable instructions and upon determining the summary indicating the integrity of data to be protected in the first control component, configured to:
determine a first integrity protection summary specific to the first control component, the first integrity protection summary being only used for indicating the integrity of the data to be protected in the first control component, and
determine a second integrity protection summary shared by the plurality of control components including the first control component, the second integrity protection summary being used for indicating the integrity of the data to be protected in the plurality of control components, and
wherein the at least one processor is further, upon execution of the executable instructions, configured to:
determine the second integrity protection summary based on an identity feature from among the identity features of each of the plurality of control components, and based on a data feature from among the data features of each of the plurality of control components, and
distribute the second integrity protection summary to each of the plurality of control components.

10. The device of claim 9, wherein
the at least one processor is further, upon execution of the executable instructions, configured to rank the plurality of control components when ranking the plurality of control components;
the at least one processor is further, upon execution of the executable instructions and upon determining the first integrity protection summary, configured to:
determine the first integrity protection summary of the first control component based on a first integrity protection summary of a ranked second control component next to the first control component and determine the identity feature and the data feature of the first control component, and
simultaneously store the first integrity protection summary into a control component following the first control component, wherein the first integrity protection summary of the second control component is determined based on the identity features and the data features of all other control components previous to the first control component.

11. The device of claim 10, wherein the first integrity protection summary of the last control component of the plurality of control components is stored into the control component at a starting position of the rank as a second integrity protection summary.

12. The device of claim 9, wherein the at least one processor, upon execution of the executable instructions, is further configured to:
divide the plurality of control components into at least one group,
generate a temporary integrity protection summary of the at least one group of control components based on the identity features and the data features of the respective control components in each group; and
determine the second integrity protection summary based on the temporary integrity protection summary of each at least one group generated.

13. The device of claim 9, wherein the at least one processor, upon execution of the executable instructions, is further configured to:
extract the data features and the identity features of all the control components in the industrial control system;

re-determine the second integrity protection summary; and determine that the data to be protected in part of or all of the plurality of control components in industrial control system changes upon the second integrity protection summary, re-determined, not coinciding with the second integrity protection summary.

14. The device of claim 9, wherein the at least one processor, upon execution of the executable instructions, is further configured to:

maintain a list storing a first integrity protection summary of each control component in the industrial control system and the second integrity protection summary, re-determine the first integrity protection summaries of the first control component and all control components behind the first control component and the second integrity protection summary upon the identity feature or the data feature of the first control component changes, and update corresponding values corresponding to the first control component and all the control components behind the first control component in the list by using the first integrity protection summaries and second integrity protection summary re-determined.

15. A non-transitory machine-readable medium, storing executable instructions which, upon execution by a machine, enable the machine to execute:

establishing a correlation among a plurality of control components in an industrial control system; and determining a summary indicating integrity of data to be protected in a first control component based on identity features and data features of other control components correlated to the first control component among the plurality of control components, wherein the data features are used for identifying the data to be protected in the control components, and the first control component is any one of the plurality of control components, wherein the determining of the summary indicating the integrity of data to be protected in the first control component includes:

determining a first integrity protection summary specific to the first control component, the first integrity protection summary being only used for indicating the integrity of the data to be protected in the first control component, and determining a second integrity protection summary shared by the plurality of control components including the first control component, the second integrity protection summary being used for indicating the integrity of the data to be protected in the plurality of control components, further comprising:

determining the second integrity protection summary based on an identity feature from among the identity features of each of the plurality of control components, and based on a data feature from among the data features of each of the plurality of control components, and distributing the second integrity protection summary to each of the plurality of control components.

* * * * *